No. 767,514.  Patented August 16, 1904.

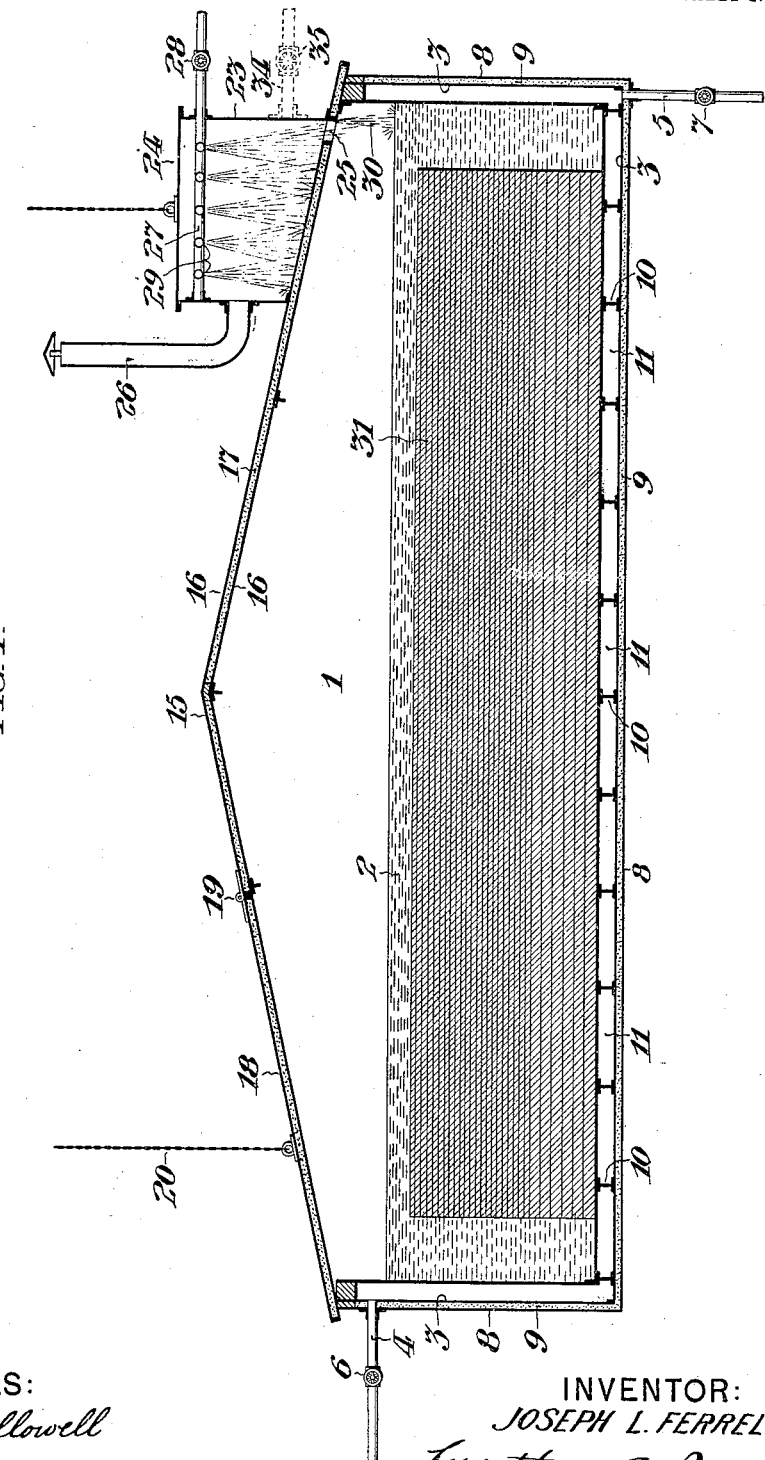

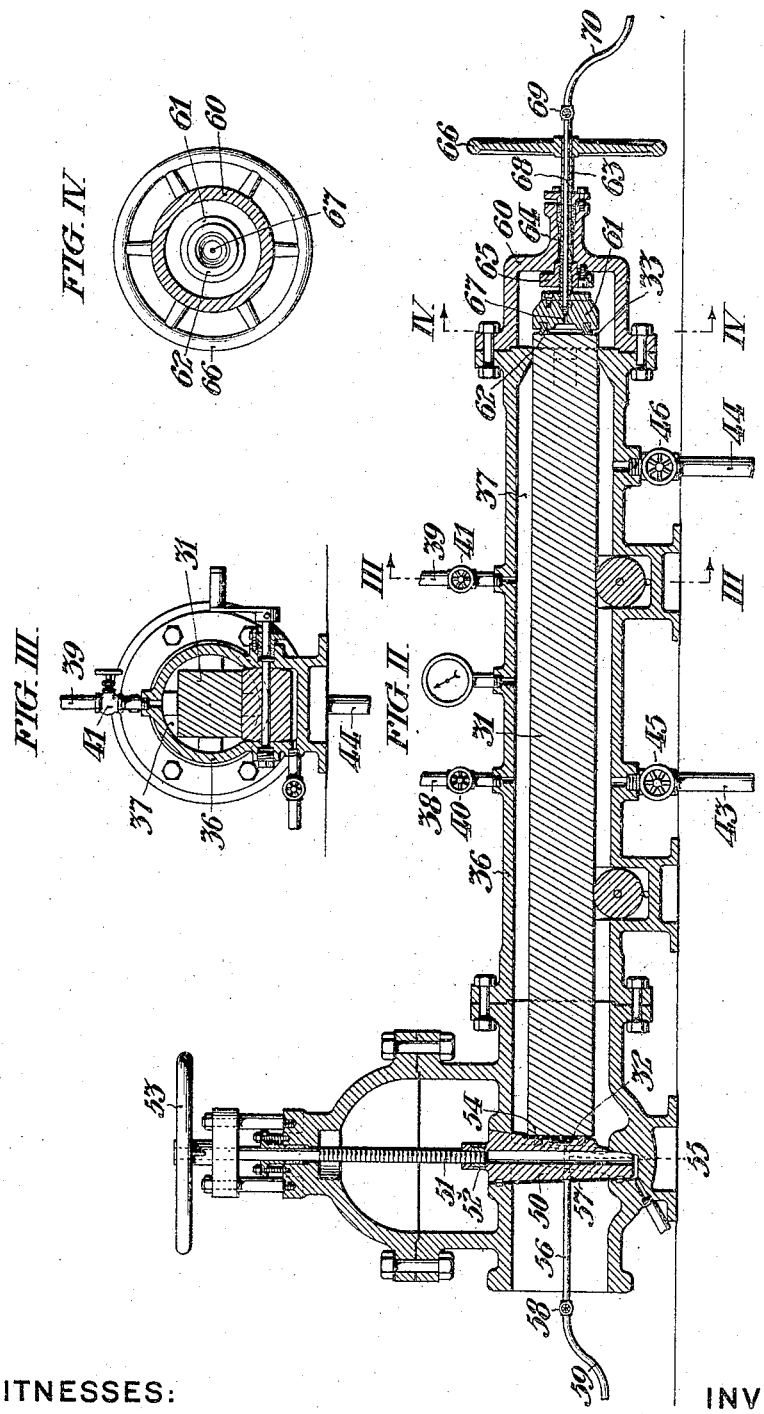

UNITED STATES PATENT OFFICE.

JOSEPH L. FERRELL, OF PHILADELPHIA, PENNSYLVANIA.

PROCESS OF FIREPROOFING WOOD.

SPECIFICATION forming part of Letters Patent No. 767,514, dated August 16, 1904.

Application filed September 21, 1901. Serial No. 76,075. (No specimens.)

*To all whom it may concern:*

Be it known that I, JOSEPH L. FERRELL, of Philadelphia, in the State of Pennsylvania, have invented certain new and useful Improvements in Processes of Fireproofing Wood, whereof the following is a specification, reference being had to the accompanying drawings.

The particular application of my process at present contemplated is the fireproofing of wood, and I will therefore simplify the following description by adverting only to such process, it being understood, however, that I do not, therefore, intend to limit my claims accordingly.

My present invention comprises the process of impregnating a wooden body with a chemical reagent by boiling said body in an aqueous solution comprising said reagent and maintaining said solution under ordinary atmospheric pressure during said boiling.

My invention also comprehends an additional step of particular advantage in the deposit or formation of mixed chemical reagents within a wooden body, which step consists in injecting within said boiled body under pressure an aqueous solution comprising another reagent until the second reagent is mixed with the first reagent throughout the substance of the wood.

I have found in practice that the impregnating solution is increased in specific gravity by concentration during the conduct of my process, such concentration being caused not only by the vaporization of the solution, but also by the selective absorption by the wood of such portions of the solution as are most fluid. Therefore I find it renders the product more uniform to add to the boiling solution during the conduct of my process a sufficient quantity of liquid to maintain said solution of constant specific gravity, and it is to be understood that my invention comprehends this feature as supplemental to the other features aforesaid.

As far as I know, in all prior processes of this class which include the step of boiling wood in a chemical solution the solution is maintained under pressure exceeding that of the atmosphere, and the maintenance of such pressure necessitates the employment of complicated apparatus which is not only primarily expensive, but requires such expenditure of time and labor in inserting and removing the wood that the cost of manipulation of the apparatus forms a very large percentage of the total cost of the treatment of the wood.

My present invention is advantageous in that the boiling apparatus is not required to withstand steam-pressure, and therefore may be cheaply and economically constructed. Moreover, the only manipulation of said apparatus required by my process is the removal and the replacement of a loose lid when the wood is removed and replaced, and therefore the cost for manipulation of the apparatus is reduced to the minimum.

In the drawings, Figure I is a central sectional view of an apparatus conveniently adapted for the conduct of the boiling step of my process. Fig. II is a longitudinal sectional view of an apparatus conveniently adapted for the compressive injection step of my process. Fig. III is a transverse sectional view taken on the line III III in Fig. II. Fig. IV is a transverse sectional view taken on the line IV IV in Fig. II.

Referring to the apparatus shown in Fig. I, the tank 1 serves to retain the solution 2, comprising a chemical reagent. Said tank is inclosed by steam-jacket 3, provided with the steam-inlet 4 and drip-outlet 5, respectively controlled by the valves 6 and 7. Said jacket 3 is also inclosed by the outer shell 8, the space between said jacket 3 and shell 8 being conveniently packed with some substance 9 which is a non-conductor of heat. It is to be understood that the beams 10, which support the floor of the tank 1, alternately terminate short of the opposite sides of the steam-space 11, so that the steam is caused to traverse back and forth in said space 11 in passing from the inlet 4 to the outlet 5. Said tank 1 is provided with the roof 15, conveniently formed of opposed plates 16, inclosing the non-conducting material 17, and 18 is a lid of similar construction which is hinged to the roof 15, as indicated at 19. Said lid 18 being loose may be quickly raised or lowered by means of the flexible connector 20. Conveniently mounted upon said roof 15 is the condenser-casing 23, provided with the removable lid 24. The interior of the tank 1 communicates with said casing 23 through the opening 25 in the roof 15, and said casing 23 is provided with the vent 26 in open communication with the atmosphere. The construction aforesaid is such that vapor generated within the tank 1 from the boiling solution 2 would be discharged directly into the atmosphere through the opening 25, casing 23, and vent 26, and a large percentage of the valuable constituents of said solution be thus wasted if means were not provided to retain said vapor. Therefore I provide the spray-pipe 27, controlled by the valve 28, through which water or any other suitable liquid may be discharged from the jets 29 in a spray which practically fills the condenser-casing 23 and serves to condense the vapors arising from the boiling solution 2 and wash the valuable constituents thereof back into the tank 1, as indicated at 30. It is to be understood that the valve 28 may be so regulated that the quantity of liquid delivered therethrough is precisely sufficient to maintain the specific gravity of the solution 2 constant during the boiling operation, which tends to concentrate said solution not only by the vaporization aforesaid, but also by the selective absorption of the more fluid portions of the solution by the wood, which is indicated at 31 in Fig. I. Although the solution 2 may be initially supplied to the tank 1 in any convenient manner, I prefer to provide the casing 23 with the inlet 34, controlled by the valve 35, in communication with a supply of the desired solution.

The apparatus above described is employed in the conduct of my process as follows: An aqueous solution of the desired chemical reagent being placed within the tank 1 is caused to boil by the steam admitted to the space 11. Thereupon the lid 18 being uplifted the wood 31 is immersed in said solution, as indicated, and there retained until impregnated to the desired degree by the reagent comprised in said solution, the latter being constantly maintained at atmospheric pressure by communication with the atmosphere through the opening 25, casing 23, and vent 26, and also being preferably maintained at constant specific gravity by the increment of liquid introduced through the pipe 27, as aforesaid.

If the desired impregnation is secured by the boiling operation above described, the wood 31 is removed from the apparatus shown in Fig. I and dried in any convenient manner. If, however, it is desired to deposit or form a mixed salt throughout said body 31 by the successive action of two reagents which react upon each other in the production of such salt, said body is first impregnated with one of said reagents by the boiling step aforesaid, and then said body is impregnated with the other of said reagents by the employment of the apparatus shown in Figs. II to IV, inclusive, as follows: Referring to said figures, 36 is an impregnating-receptacle adapted to inclose the body 31 within the space 37. Said receptacle is provided with inlets 38 and 39, respectively, controlled by the valves 40 and 41. Said receptacle is also provided with the corresponding outlets 43 and 44, respectively, controlled by the valves 45 and 46. A solution comprising the desired reagent may be introduced to the receptacle 36 under pressure by means of said inlets and said pressure maintained until said reagent is mixed with the first reagent throughout the substance of the wood. However, I find that the second impregnation may be more rapidly effected by injecting the solution in the body 31 under pressure at one end thereof in the direction of the grain of the wood and simultaneously discharging the fluid of solution from the opposite end of said body until the specific gravity of the liquid being emitted at the discharge end of said body is substantially equal to that of the solution at the initial end thereof, thereupon preventing the escape of said liquid from said body at said discharge end thereof and continuing the injection of the solution under pressure until the reagent is distributed radially from the center through the substance of the wood and appears at the circumference thereof. Such an operation of course necessitates the seclusion of the ends 32 and 33 of the body 31, so that they may be subjected to the pressure of the solution or be opened to the atmosphere at the will of the operator, and for this purpose the apparatus is constructed as follows: As shown in Fig. II, one extremity of the receptacle 36 is provided with the gate 50, whose stem 51 is engaged with the nut 52, so as to raise and lower the gate when the stem 51 is rotated in one direction or the other by means of the hand-wheel 53. Said gate 50 is provided upon its inner face with the packing-ring 54, which incloses the duct 55, extending through the gate. The pipe 56 is screw-threaded at 57, so as to be readily connected with said duct 55 when the gate is lowered and detached therefrom to permit the gate to be raised. Said pipe 56 is controlled by the valve 58 and connected with the flexible conduit 59. The opposite extremity of said receptacle 36 is closed by the lid 60, which is provided with an adjustable abutment, comprising the thrust-plate 61, provided with the packing-ring 62. Said plate 61 is in swiveled connection with the thrust-bar 63, which is entered through the stuffing-box 64 in the lid 60, and is longitudinally adjustable through the nut 65, which is fixed in said lid. Said thrust-bar being provided with a hand-wheel 66 may be rotated in said nut 65, and thereby shifted in or out through the lid 60. Said plate 61 is provided with the duct 67, which is in communication with the pipe 68 and controlled by the valve 69 in connection with the flexible conduit 70, the arrangement being such that although the bar 63 may be rotated to advance or retract the plate 61 said pipe 68 remains in fixed relation with said plate 61. In order to insert the wood 31 in the position shown in Fig. II, the thrust-plate 61 is retracted a sufficient distance to permit the insertion of said wood clear of the gate 50 while the latter is uplifted. Then the gate 50 being lowered to the position shown the wheel 66 is rotated, and the plate 61 thereby advanced until the opposite ends 32 and 33 of the wood 31 are respectively compressed and sealed in connection with said plate 61 and said gate 50. Thereafter the reagent solution may be injected within said body 31 as last described—to wit, under pressure at one end thereof—and discharged therefrom at the other end until the specific gravity of the liquid emitted at the discharge end of the wood is substantially equal to that of the solution being injected at the initial end thereof, and thereupon the emission of the liquid at the discharge end may be terminated and the injection at the opposite end be continued under pressure until the reagent is distributed radially from the center through the substance of the wood and appears at the circumference thereof.

It is to be understood that the process herein described may be utilized in impregnating wood with any suitable fireproofing, preservative, or other reagent, and I do not desire to limit myself to the use of any particular chemical or chemicals. However, I cite the following as typical chemicals which are both fireproofing and preservative: aluminium sulfate used alone or with other ingredients in a single aqueous solution from which the salt is deposited without apparent decomposition; sodium chlorid used alone or with other ingredients in a single aqueous solution from which the salt is deposited without apparent decomposition; sodium chlorid followed by aluminium sulfate and producing soluble sodium sulfate and aluminium chlorid; calcium chlorid followed by aluminium sulfate and producing insoluble calcium sulfate and aluminium chlorid; sodium silicate followed by calcium chlorid and producing insoluble calcium silicate and sodium chlorid. Moreover, although I have described a particular type of apparatus as a means by which my process may be conducted, I do not desire to limit myself thereto, as it is obvious that various forms of apparatus may be devised for the purpose described.

I claim—

1. The hereinbefore-described process of impregnating wood with mixed chemicals, which consists in boiling the wood in an aqueous solution comprising one chemical; maintaining said solution of its initial specific gravity and in communication with the atmosphere; then secluding the wood from communication with the atmosphere and injecting within the wood under pressure, another aqueous solution comprising a different chemical, until the second chemical is mixed with the first chemical throughout the substance of the wood, substantially as set forth.

2. The hereinbefore-described process of impregnating wood with preservative materials, which consists in successively boiling the wood in separate aqueous solutions; one of said solutions containing calcium chlorid and the other of said solutions containing aluminium sulfate, with the result of depositing insoluble calcium sulfate and aluminium chlorid in the wood, substantially as set forth.

In testimony whereof I have hereunto signed my name, at Philadelphia, Pennsylvania, this 20th day of September, 1901.

JOSEPH L. FERRELL.

Witnesses:
  PHILIP PISTOR,
  ARTHUR E. PAIGE.